United States Patent
Balakrishnan et al.

[11] Patent Number: 6,115,028
[45] Date of Patent: *Sep. 5, 2000

[54] THREE DIMENSIONAL INPUT SYSTEM USING TILT

[75] Inventors: Ravin Balakrishnan; Thomas P. H. Baudel; Gordon P. Kurtenbach; George W. Fitzmaurice, all of Toronto, Canada

[73] Assignee: Silicon Graphics, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/701,674

[22] Filed: Aug. 22, 1996

[51] Int. Cl.$^7$ .................................................. G09G 5/08
[52] U.S. Cl. ......................... 345/157; 345/163; 345/167; 74/471 XY
[58] Field of Search ................................. 345/157, 156, 345/161, 163, 167; 74/471 XY

[56] References Cited

U.S. PATENT DOCUMENTS

| | | | |
|---|---|---|---|
| 4,550,316 | 10/1985 | Whetstone et al. | 345/163 |
| 4,769,517 | 9/1988 | Swinney | 345/161 |
| 5,162,781 | 11/1992 | Cambridge | 345/163 |
| 5,252,870 | 10/1993 | Jacobsen et al. | 310/82 |
| 5,260,696 | 11/1993 | Maynard, Jr. | 345/163 |
| 5,298,919 | 3/1994 | Chang | 345/163 |
| 5,491,497 | 2/1996 | Suzuki | 345/157 |
| 5,503,040 | 4/1996 | Wright | 345/157 |
| 5,512,920 | 4/1996 | Gibson | 345/167 |
| 5,619,231 | 4/1997 | Shouen | 345/163 |
| 5,675,309 | 10/1997 | Devolpi | 74/471 XY |
| 5,790,102 | 8/1998 | Nassimi | 345/163 |

OTHER PUBLICATIONS

"Flock of Birds".

Fukuzaki, Y. (1993), Electronic pen according to the BTRON guideline and its background, TRONWARE, vol. 4, Personal Media Publishers, Japan, pp. 49–62.

Dan Venolia, "Facile 3D Direct Manipulation", *INTERCHI'93*, Apr. 24–29, 1993, pp. 31–36.

"Three dimensions at your fingertips—SpaceMaster", BASYS GmbH.

home up—Space Control Mouse.

home up—3D Mouse.

Spacetec IMC Corporation, "The Spaceball 2003", 3D Input Device, 1995 by Qualix Group Inc.

Polhemus, "3Ball", Jul, 1995.

Polhemus, "Fastrak", Jul. 1995.

Polhemus, "Isotrak II", Jul. 1995.

Polhemus, "Ultartrak Pro", Mar. 1996.

*Primary Examiner*—Jeffery A. Hofsass
*Assistant Examiner*—John Tweel, Jr.
*Attorney, Agent, or Firm*—Staas & Halsey LLP

[57] ABSTRACT

An input system for controlling the position or motion of a cursor, three dimensions that uses x, z position for inputting two coordinates and tilt in a plane (x-y or z-y) to input a third (and possibly a fourth coordinate). The invention is moved about on a surface for inputting two of the dimensions and tilted to input the third. The amount or degree of tilt and the direction of tilt controls the input of the third dimension. The base of the hand held device is curved so that the device can be tilted even while it is moved in two dimensions along the surface of the tablet. Tilting can be along two orthogonal axes allowing the device to input four coordinates if desired. The coil can also have switched resistors controlled by mouse buttons connected to it which the tablet can sense being activated to allow clutching and selection operations like those of a conventional mouse.

39 Claims, 8 Drawing Sheets

THREE DIMENSIONAL INPUT SYSTEM USING TILT

BACKGROUND OF THE INVENTION

1. Field of the Invention

The present invention is directed to a system for inputting three-dimensional (3-D) coordinates for a three-dimensional model and, more particularly, to a system that uses planar motion of an input device to input a pair of orthogonal coordinates and tilt of the input device to input a third (and optionally a fourth) coordinate, orthogonal to each of the coordinates input via the planar motion, to thereby allow a cursor to be moved about within the three-dimensional model.

2. Description of the Related Art

Input devices for controlling a cursor of a three dimensional model generally fall into three categories. The first is the conventional mouse.

The ubiquitous 2-D mouse is currently the input device of choice for desktop 3-D applications for several key reasons including the fact that the mouse operates on a flat horizontal surface. This is less fatiguing when compared with devices which are manipulated and held in 3-D space. The user is not limited to a particular grip. The mouse can be used in a variety of "lazy/relaxed" grips ranging from a precision grip for accurate movements to also simply hitting it to move the cursor from one window to another. The mouse is a relative device with implicit clutching (the act of placing the input device in an active input mode or engaging the input action of the input device), the amount of movement required can be very small. This allows users to be lazy (which is a good thing!). The mouse usually uses position control instead of rate control. This is critical for pointing tasks because it permits ballistic movements and reversible actions (e.g., spin the world around and return back to original position) with predictable response, unlike force-sensing rate controlled devices. The mouse is usually in a stable state where it is ready to be used and does not have to be "disturbed" to park or unpark the device. In contrast, a stylus device will be disturbed when a user picks up or releases it. Since the movement of the buttons are orthogonal to the sensing dimensions, it is easy to operate the buttons without affecting the sensing dimensions (i.e., inadvertently moving the cursor while hitting buttons). The mapping of 2-D mouse device motion to cursor motion is "natural" (i.e., move the mouse up, the cursor moves up; move mouse left, the cursor moves left). This reduces the cognitive load on the user. The implicit clutching mechanism (lifting the device off and replacing it on the work surface) is easily understood and executed, flexible and comfortable when compared to using an explicit clutch button. While these factors make the mouse close to a perfect 2-D input device, it does not inherently support 3-D operations thus requiring the use of graphical manipulators, hotkeys and other extensions to perform 3-D actions. This usually reduces what is often a single integral action into two or more separated, 2-dimensional or less, and cognitively very distinct actions. For example, moving an object in 3-D space from point A to point B requires a minimum of three actions using the mouse: 1) move along one plane, 2) switch movement to second plane and 3) complete movement to desired position. Very often additional actions are required to effect small corrections.

The second type of device provides control in three input axes. This type of device, which can be called a three degree of freedom isometric (not moving) device, is fixed in position on the user's desk. The user, by pushing a control knob left/right, away/toward and up/down can enter three different coordinates. This device, because it is fixed in place, as say compared to a mouse, is a force sensitive device where the force applied by the user keeps the cursor moving and the amount of force controls the speed of the cursor movement. The problem with this arrangement is that the user must pay particular attention to the cursor, releasing his/her force on the control knob when the cursor is at the correct location, as opposed to simply moving the device and hence the cursor to the correct location.

The third type of device is a device with three degrees of freedom. This device is held in the hand and is freely moved about in three dimensions in a three dimensional electromagnetic field and the position and motion in three dimensions controls proportional movements of the cursor in three dimensions. This type of device can be extremely fatiguing on the user since the device has to be supported in the air by the user and is not practical for day in and day out input.

What is needed is a system that allows the ease of use and position control of a mouse but does not require the need for the separate actions to control the third dimension as in the mouse.

SUMMARY OF THE INVENTION

It is an object of the present invention to provide an input device that can be operated using position control, like a mouse, when inputting two dimensional coordinates and can be tilted to input coordinates of a third (and a fourth) dimension.

It is another object of the present invention to provide a three-dimensional input device that can be easily constrained to operate in two dimensions.

It is also an object of the present invention to provide a device that is self righting.

It is a further object of the present invention to provide a method for inputting three-dimensional coordinates using a device that moves like a mouse and tilts.

It is an object of the invention to allow the user to simultaneously input three or four dimensions.

It is another object of the invention to allow implicit clutching similar to that used in a mechanical mouse.

It is also an object of the invention to be backwardly compatible with a mouse.

It is a further object of the invention to provide either a relative or absolute device.

The above objects can be attained by an input device that uses position on a plane for inputting two coordinates and tilt to input a third and optionally a fourth coordinate. The device, which could be called a tilting mouse, is moved about on a surface for inputting two dimensions and tilted to input a third. The device includes a sensor system that senses two dimensional planar position as well as the tilt about those two planar dimensions. The amount or degree of tilt and the direction of tilt control the input for the third dimension. The base of the input device is curved (optionally in two directions) to facilitate a smooth tilting action as well as allowing for the planar movement of the device while it is held in a tilted position. The curved base allows the device to be self righting. The base includes a flat spot that provides the user with a feed back cue that allows the user to keep the device on the flat spot (i.e., constrained to move on a plane) if only two dimensional input is desired. The device also allows the input of button activations. Tilting can be along two orthogonal axes allowing the device to input four coordinates if desired.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Prior to discussing the details of the present invention a brief discussion of important features of the invention will be provided.

The present invention includes an input device that provides three and optionally four degrees of freedom and is an isotonic input device designed for efficient integral manipulation in 3-D environments. The device includes a grip mounted on a curved base with a flat indentation in the center. A sensor or position and tilt indicator embedded in the base allows for the detection of the device's position on the x-z plane as well as the angle of tilt about the x-axis, z-axis or both. When tilt about one of these axes is mapped to translation in the y-axis, fully integrated translational manipulation in 3-D is achieved.

As will be discussed in more detail later the device includes a curved self-righting base. The type and degree of curvature may vary depending on the grip used and desired interaction. Variations include semi-spherical (curved equally along both x and z axes), curved by different amounts along the two axes, curved only along the x-axis or curved only along the z-axis. The degree of curvature is such that when not being gripped the device will return to its default position perpendicular to the x-z plane.

The device includes a small flat indentation at the center of the curved base. This allows for the device to be easily constrained to move only along the x-z plane, thus allowing the user to seamlessly shift between 3-D and 2-D manipulation. It also facilitates the self-righting feature described previously.

The inputs of the physical device can be mapped to the computer display in a number of different ways. If zero-order (position) control is used, the amount of tilt about one of the axes (x or z) can be mapped to absolute or relative translation along the y-axis. Tilt about the other axis can optionally be used to control the control-display (C-D) gain (sometimes called the cursor movement scale factor). First-order (rate) control can be used and the amount of tilt about one axis controls the rate of translation along the y-axis. The position of the device on the physical x-z plane can be used to control translation along the x and z axes using absolute position, relative position or rate control. Various other mappings are also possible, including a combined position and rate control strategy (e.g., position control is enabled during small to moderate tilts, then it transitions into rate control during extreme tilt-and-hold gestures).

Figure 1:
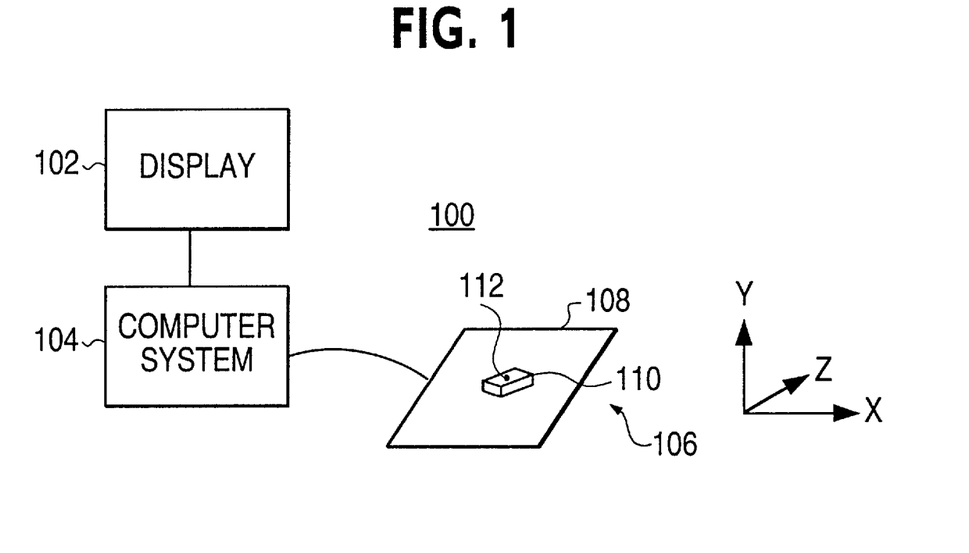
FIG. 1 depicts a system 100 according to the present invention.

The present invention can be implemented in a system, 100 such as illustrated in FIG. 1. The system includes a display 102, such as found in work stations used for three dimensional graphics image processing and which displays a three-dimensional model or three dimensional scene which has a cursor or some other three-dimensional feature that needs to be controlled. The display 102 is controlled by a computer system 104, which can be a typical desk top, graphics imaging type work station that includes the typical storage devices, such as a floppy or hard disk, upon which the process of the present invention can be stored. An appropriate display 102 and computer system 104 are available from Silicon Graphics, Inc. The computer system 104 typically performs a process that allows a user to control the model using an input device 106. The input device 106 of the present invention includes an input tablet 108, such as a UD series model tablet from Wacom Technologies of Japan. The tablet 108 is typically used with a pen (or stylus) and senses the position and 2-D tilting when the pen contacts the tablet and the pen senses an amount of force applied by the pen to the tablet. Instead of the pen, the present invention uses a tiltable mouse 110 which includes an indicator 112 (a cordless sensor) that the tablet 108 can detect that not only indicates position on the tablet 108 but the angle of tilt of the indicator 112 with respect to the tablet 108. The circuit of the indicator 112 and the details of the tiltable mouse 110 will be discussed in greater detail later herein. The tablet 108 outputs a set of values, at 200 sets per second, over a serial input to the computer 104 where two of the values indicate the x and z position of the indicator 112 on the tablet 108, two indicate the tilt of the indicator 112 in the x-y and z-y planes of the tablet 108 and one of the values indicates which button on the input device has been depressed. When the indicator is used within a Wacom "puck" type input device, the tablet 108 will also output a single button position indication. The indicator 112 is the same sensor as found in the pen that ships with the Wacom Technologies UD series tablets.

Figure 2:
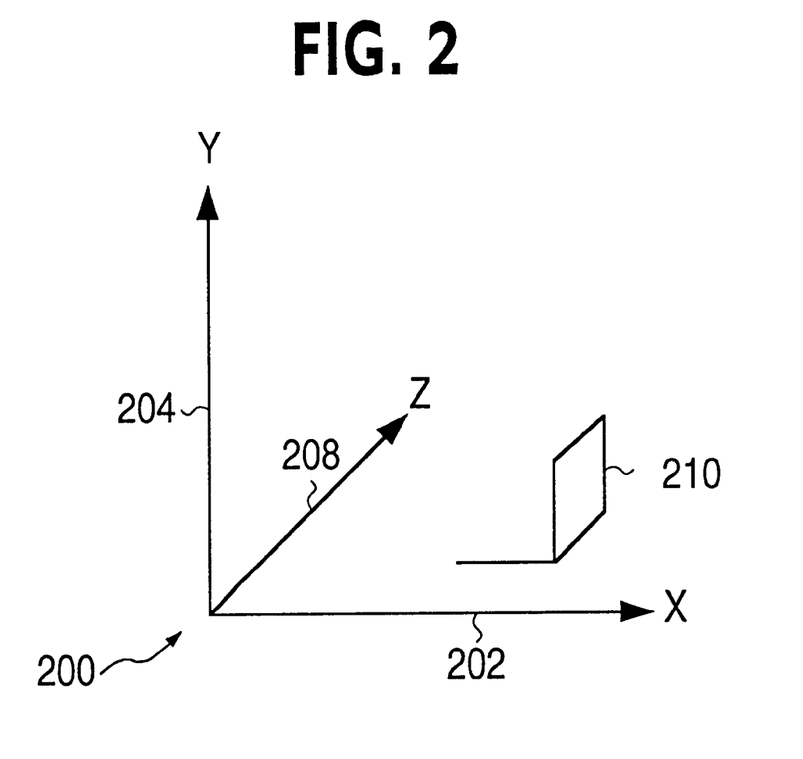
FIG. 2 illustrates a three-dimensional coordinate system 200 and a three-dimensional cursor path 210 which can be created by the present invention.

FIG. 2 depicts a three dimensional coordinate system 200 with the x coordinate being the left-right axis 202 of the tablet 108, the y coordinate being the vertical or up-down axis 204 with respect to the tablet 108 and the z coordinate being the forward-backward axis 208 of the tablet 108. FIG. 2 also shows a three-dimensional path 210 of a cursor as it is moved by an input device according to the present invention. The path 210 depicts the path a cursor takes when the user is drawing a 3-D box and shows four of the twelve edges of such a box.

Figure 3:
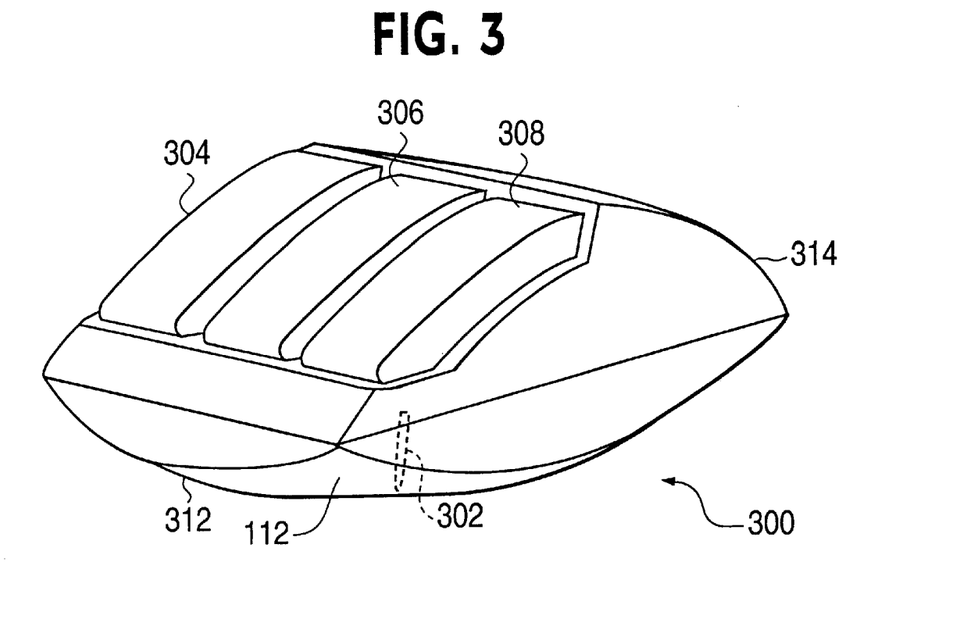
FIG. 3 is a perspective view of a tilting mouse type input device 300 according to the present invention.

FIG. 3 depicts a perspective view of a preferred embodiment of the tilting mouse 300 of the present invention in which the indicator 112 is positioned in the center of the mouse 300. The indicator 112 is essentially a coil 302 that modifies an electromagnetic field produced by the tablet 108 allowing the tablet 108 to determine the position and tilt of the coil 302 based on the changes in the electromagnetic field. The indicator 112 comes with a circuit board (not shown) that allows several buttons 304,306 and 308 to be connected to the coil 302. As will be discussed in more detail later the switches modify the field of the coil 302 allowing the tablet to detect the depression of the buttons 304,306 and 308.

Input devices according to the present invention are designed to retain the characteristics of the conventional mouse which make it so successful while overcoming the main shortfall of the conventional mouse by providing a seamless shift into truly integral 3-D manipulation when desired. This is accomplished by a curved base design (see 312 of FIG. 3 and 402, 502,602 of FIGS. 4–6) which allows tilt in the x-y and/or z-y planes to be mapped to movement in the y-axis without sacrificing the desirable properties of the mouse.

The base of the input device (see FIGS. 3–6) has approximately the same footprint as a generic 2-D mouse, but has a curved bottom. While many variations are possible, four main shapes of the base are practical.

Figure 4A:
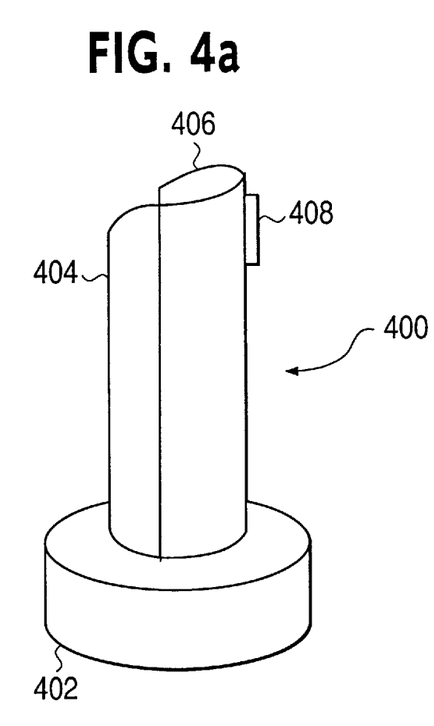
FIGS. 4a and 4b depict another embodiment 400 of the input device of the present invention.
Figure 4B:
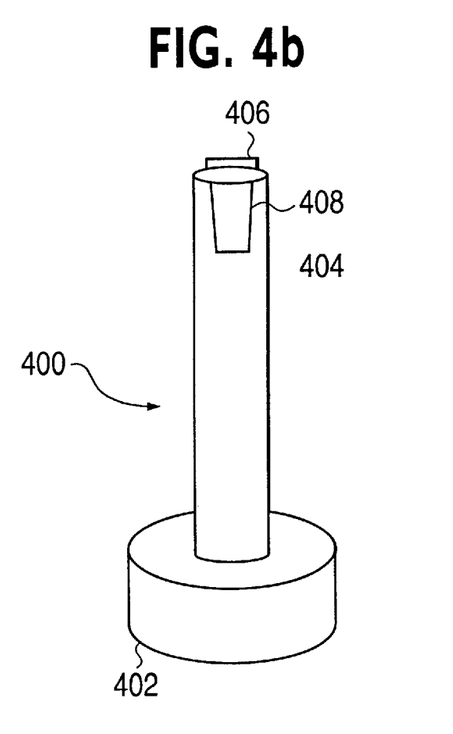

The base 402 can have a symmetric curvature about both the x and z axes (see FIGS. 4a and 4b depicting a joy-stick type tilting mouse device 400), resulting in a semi-spherical and symmetrically curved base akin to a saucer. The actual curvature is an issue that can be determined by user preference. This approach allows for the device 400 to be tilted in equal amounts in both directions. The choice of which direction of tilt is to be mapped to movement in the y-axis can be left to the user, with the possibility of using tilt in the other direction to control the control-display gain or some other parameter.

Figures 5A, 5B:
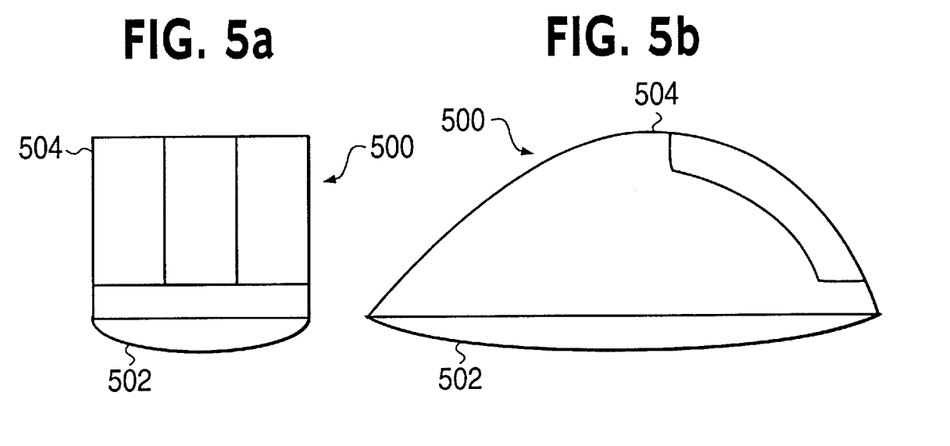
FIGS. 5a and 5b illustrate a further embodiment 500 of the input device of the present invention.

The base 502 of the device 500 can have an asymmetric curvature about the two axes (compare FIG. 5a and 5b showing end and side views, respectively, and see FIG. 3) where the curvature about one axis is greater than the other. In this approach, tilt along the axis with greater range of movement can be mapped to movement in the y-axis while tilt in the other direction could control the control display gain/speed of cursor movement, or some other parameter or simply left unused. If left unused, this design allows for a very relaxing posture of the wrist when tilting the device along the active axis.

Figures 6A, 6B:
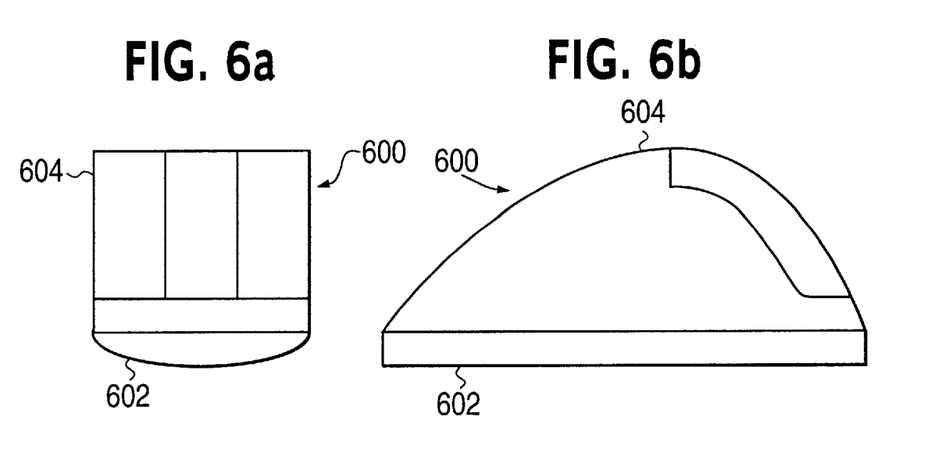
FIGS. 6a and 6b illustrate another mouse like embodiment 600 of the input device of the present invention.

The base 602 of the device 600 can be curved only about the x-axis (see FIGS. 6a–6b showing end and side views, respectively). This effectively constrains the device to tilt within the x-y plane (i.e., left-right tilt). Since the tilt about the other axis is inactive, there is no risk of false activation. This approach, when combined with a mouse like grip, allows for tilt to be controlled by circumduction of the user's wrist joint and does not require the arm to move, minimizing fatigue. Of course the base can be curved also only about the z-axis. This will constrain the device to tilt within the z-y plane (i.e., forward-backward tilt). However, tilt will now be controlled by flexion/extension of the wrist joint which necessarily implies movement of the arm. This type of movement could be fatiguing for the user.

Figure 7:
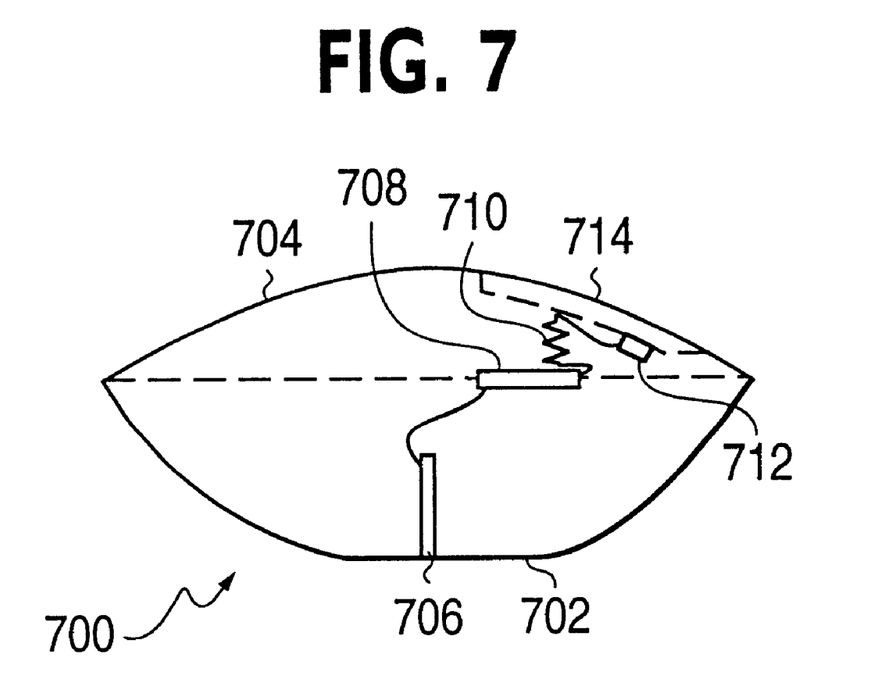
FIG. 7 is a side cut away view illustrating a flat spot 702 and a coil 706 according to the present invention.

As illustrated by the device 700 shown in FIG. 7, at the center of the base, preferably, there is a flat indentation or flat spot 702 which is a circle about the size of a penny for the bases which curve about both axes and a flat strip about 4 mm long and perpendicular to the direction of tilt for the bases which curve about only one axis. This allows the device to be constrained to move in the x-z plane so that traditional 2-D interactions can be performed in a manner identical to the mouse. The flat spot also allows for easy return to an orientation which is normal to the x-z plane while not hampering the ability to use the x-y or z-y planar tilt degrees of freedom in a fluid simultaneous way. Finally, the flat spot, when the device is bottom weighted, results in a self-righting base which returns to a default position when released by the user instead of toppling over like a stylus.

Two main types of handles or gripping areas can be attached to the curved base of the input device.

The first type of handle is a mouse-like palmar handle (see 314, 504, 604 and 704 of FIGS. 3, 5, 6 and 7, respectively). Like the mouse, this handle allows for grips ranging from a precision palm and fingers grip to a power palmar grip. This handle tends to invoke the smaller muscle groups of the hand and movement about the wrist joint. However, if the front-back tilt of the device is used for the y-axis, the mouse axes of the buttons axes are aligned with the axis of motion, which may result in button presses affecting the amount of tilt of the device. Note that a "button bumper" can be designed to allow the fingers to rest on a ridge on the front of the mouse, minimizing the possibility of an accidental button press (see FIG. 3).

The second type of handle is a joystick style pistol handle (see 404 of FIG. 4). This type of handle has the drawbacks of involving more movements from the wrist joints, inducing probably more fatigue, of being less stable on a flat surface than the tilting mouse (unless the base is weighted), and departs slightly from the common design of mice, and may require a longer user adaptation period initially. However, this grip gives more leverage along the tilting axis, resulting in more symmetry in the integral manipulation along three axes of translation (i.e., the amount of rotation along the z-axis can be perceived as a translation of the top of the handle rather than a true rotation). This type of handle 404 also allows more precision in 3D integral movements and requires less clutching and adaptation when moving from 2D to 3D manipulation. Two buttons 406 and 408 are shown in the handle 404.

Variations on these grips are also possible. For example, a mouse-like palmar handle with ridges along the side where the thumb and little finger can rest can be provided. This provides leverage when tilting about the z-axis (left-right tilt).

As previously mentioned the present invention uses a cordless sensor or indicator built by Wacom Technologies. This sensor (identical to the sensor used in the Wacom stylus) that includes a coil 706 (see also 112 and 302 of FIGS. 1 and 3, respectively) embedded in the center of the base as depicted in FIG. 7 (see also the perspective view of FIG. 3). When placed on the Wacom position and tilt-sensing tablet, also previously mentioned, position on the x-z plane, as well as angle of tilt about the x-y and z-y planes are sensed. This sensor is completely noise free and has a position resolution of $\frac{1}{100}$ of a millimeter. While this is an acceptable sensing technology, other possibilities include mechanical sensors similar to that found in mechanical mice coupled with gyroscopes for sensing tilt, a "joystick on a puck" design or a "sliding puck on a puck". However, these would require more complex mechanical design as well as moving parts and will be more expensive to build. FIG. 7 also depicts that a control circuit 708, a resistor 710 and a micro switch 712 for a button 714 are also embedded in the device 700.

The tilting mouse input device of the present invention includes 1 or more buttons. One of these buttons can be used as a clutch when the device is used in relative mode, as will be discussed in more detail later. The other buttons can then be used for any other task, including picking objects, menus, etc. Another alternative is the use of a contact sensor on the base of the device to implement implicit clutching (activation) similar to the mouse (i.e., lift off the tablet and return to clutch). The position of the buttons on the device will depend on the type of handle used. In general, the direction of movement of the buttons should be not be parallel to the direction of movement of the device to prevent the action of pressing a button from inadvertently affecting the device's position.

As the indicator is moved about on and tilted above the tablet 108 the tablet 108 produces four outputs that correspond to the position along the two axes of the tablet and two axes of tilt. The tablet produces serial binary values that range from 0–2540 as the four outputs.

Figure 8:
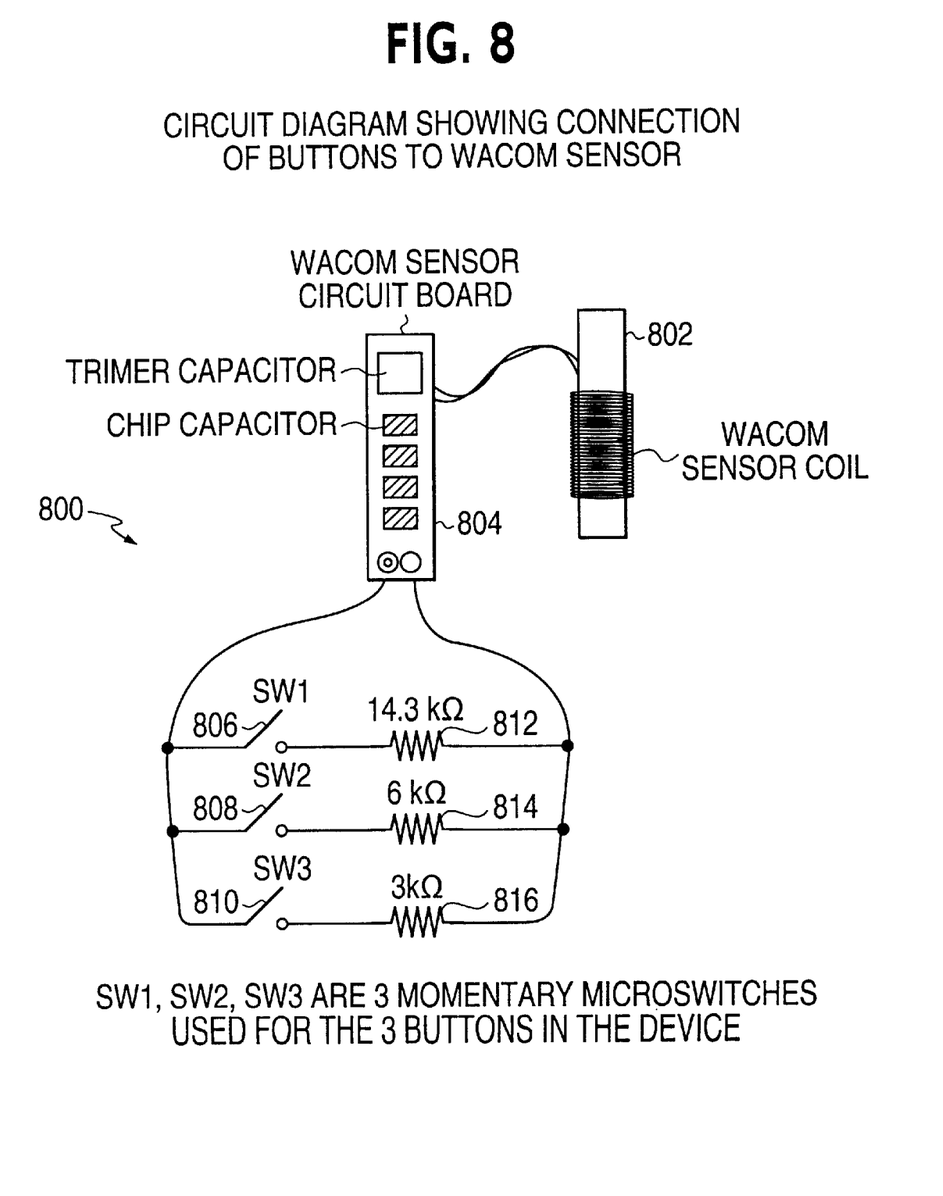
FIG. 8 is a circuit diagram of the indicator 800 of the present invention.

FIG. 8 depicts a circuit diagram of the indicator 800 (112). The indicator 800 includes a coil 802 (112/302/706) and a circuit board 804 both available from Wacom and typically used in a Wacom stylus. The tablet 112 senses the position of the coil 802 by producing an electromagnetic field that interacts with the coil 802 modifying the field produced by the tablet 112. This system allows the tablet 108 to sense the position and tilt of the coil 802 on the tablet as well as detect up to 256 values of pressure using a pressure sensor. Instead of using a pressure sensor, we use its connection to the circuit board 802 to connect one or more switches, with three switches 806, 808 and 810 being shown in FIG. 8 and corresponding to three buttons (see buttons 304, 306 and 308 of FIG. 3) on the input device. These buttons/switches can be used for clutch control, rate of movement control, etc. The switches 806, 808 and 810 connect resistances 812, 814 and 816, respectively, to the circuit board 802 which changes the effect the coil 802 has on the field of the tablet 108. As the resistance is changed the field changes which results in a modification of the pressure values output by the tablet 108. With respect to the circuit depicted in FIG. 8 the closing of switch 806 causes the production of a pressure value by the tablet 108 in the range of 70–86, inclusive. Closing switch 808 maps the pressure values to 40–51, inclusive, and closing switch 810 maps to 102–108, inclusive. As a result, the pressure output of the tablet 112 can be used to determine which of the buttons have been depressed.

Figure 9:
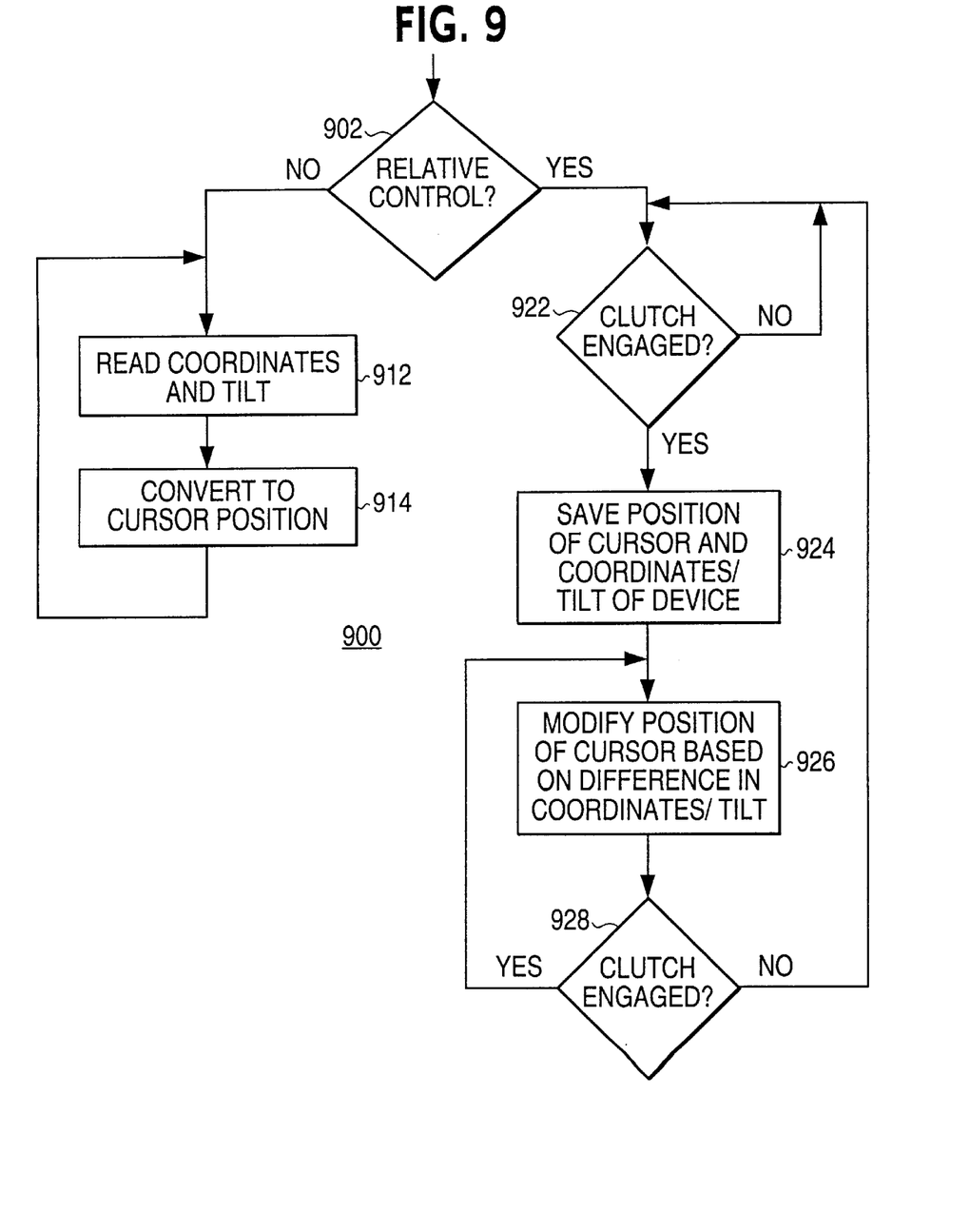
FIG. 9 is a flow chart 900 of the types of cursor movement control possible with the present invention.

The present invention can be used to control the cursor in three dimensions in two basic ways. The first is absolute control in which the position of the device 110 on the tablet 108 and the tilt of the device 110 determine the cursor position. The second is relative control in which the difference in position of the device 112 and tilt of the device 110 at the time the clutch was engaged and the current position and tilt determine the current position of the cursor. These approaches can be combined by making position absolute and tilt relative. FIG. 9 depicts these two types control with pseudocode provided later herein providing additional implementation details of the types of control. As depicted in FIG. 9, when relative position control is not chosen 902, the computer system 104 reads 912 the coordinates and tilt from the tablet 108 and then converts 914 the coordinates and tilt into three-dimensional cursor position. The coordinates are provided to a conventional display process which moves the cursor position accordingly. When the control is the relative type, the system 104 monitors the pressure outputs of the tablet 108 to detect 922 when the clutch is engaged. When the clutch is engaged, the system 104 saves 924 the coordinates and tilt of the device 110 along with the three-dimensional position of the cursor. The system 104 then samples 926 the position coordinates and tilt of the device 110 and moves the cursor three dimensionally based on the difference between the saved values and the current values as long as the clutch remains engaged 928.

The different mappings between the position and tilt of the device 110 and the three-dimensional position of the cursor will be described in more detail below using pseudocode. The software of the present invention can be implemented in any language (e.g., C or C++). Throughout the following pseudocode the following notations will be used: cursorX refers to the X-coordinate (left-right) of the cursor in the computer display, cursorY refers to the Y-coordinate (up-down) of the cursor in the computer display, cursorZ refers to the Z-coordinate (near-far) of the cursor in the computer display, devX refers to the X-coordinate (left-right) of the device on the tablet (or in device space if some other sensing technology is used), devZ refers to the Z-coordinate (near-far) of the device on the tablet, tiltZ refers to the amount of tilt of the device about the z-axis (left-right tilt—in the x-y plane), tiltX refers to the amount of tilt of the device about the x-axis (forward-backward tilt—in the z-y plane), and scalefactorX, scalefactorY and scalefactorZ are predetermined constants which determine the amount of movement for each unit of input, a higher scale factor produces more cursor movement for the same amount of device movement.

Absolute position control is one of the possible mappings. In this mode, the absolute x, z position of the device on the tablet maps to the x, z position of the cursor on the display. The y-position of the cursor maps to the absolute amount of tilt of the device. During absolute position control when there is a constant display gain (or rate of cursor movement relative to device movement) and when tiltX is mapped to movement along the y-axis the process performed is:

loop
    read device coordinates
    cursorX=devX*scalefactorX
    cursorZ=devZ*scalefactorZ
    cursorY=tiltX*scalefactorY
    display cursor
end loop When performing absolute position control again with constant control gain but with tiltZ being mapped into a translation along the y-axis, the process performed is:

loop
    read device coordinates
    cursorX=devX*scalefactorX
    cursorZ=devZ*scalefactorZ
    cursorY=tiltZ*scalefactorY
    display cursor
end loop The preferred method, however, is to use relative zero-order or position control. In this mode the amount of movement in the x and z axes is the difference between the current position of the device and the position of the device when the clutch was enabled (via a button or otherwise). The amount of movement in the y-axis will be based on the difference in magnitude between current tilt and tilt when the clutch was enabled. Obviously, large changes in magnitude or movement distance will be possible simply by releasing the clutch, reclutching and effecting another movement. During relative position control with a constant control gain and with mapping tiltX into translation along the y-axis, the process performed is:

loop
    read device coordinates and button status
    if (button transitions from not pressed to
    pressed (i.e., enable clutch)) then
        save device coordinates
        (save_devX=devX,save_devY=devZ . . . )

save cursor coordinates
(save cursorX=cursorX,save_cursorY=cursorY . . . )
end if
if (button pressed) then
   cursorX=save_cursorX+((devX-save_devX)
     *scalefactorX)
   cursorZ=save_cursorZ+((devZ-save_devZ)
     *scalefactorZ)
   cursorY=save_cursorY+((tiltX-save_tiltX)
     *scalefactorY)
else
   do nothing
end if
display cursor
end loop When performing relative position control again with constant control gain but with tiltZ being mapped into a translation along the y-axis, the process performed is:
loop
   read device coordinates and button status
   if (button transitions from not pressed to pressed (i.e., enable clutch)) then
     save device coordinates
     (save_devX=devX,save_devY=devZ . . . )
     save cursor coordinates
     (save_cursorX=cursorX,save_cursorY=cursorY . . . )
   end if
   if (button pressed) then
     cursorX=save_cursorX+((devX-save_devX)
       *scalefactorX)
     cursorZ=save_cursorZ+((devZ-save-devZ)
       *scalefactorZ)
     cursorY=save_cursorY+((tiltZ-save_tiltZ)
       *scalefactorY)
   else
     do nothing
   end if
   display cursor
end loop Many modifications to the above described processes can be made to take advantage of the tilt of the unused tilt axis when a device that can be tilted in two directions (see FIGS. 3,4 and 5) is used. For example when tiltX is used to control position along the y-axis, then tiltZ can be used to control the a display parameter such as control display (C-D) gain or speed at which the cursor moves. Variations on this mapping include: 1) with the bases that are curved in both directions, the tilt about the other axis can be used to control the C-D gain using a nonlinear transfer function (e.g., a constant acceleration transfer function: when moving slowly the C-D gain is one, but above a certain threshold speed the C-D gain is proportional to the velocity) which will allow for small precision movements at slow speeds and larger gross movements when moving fast; 2) using relative tilt to control the C-D gain (i.e., the greater the amount of tilt relative to when the clutch was enabled, the larger the C-D gain); and 3) using absolute tilt to control the C-D gain (i.e., the greater the amount of tilt relative to the normal direction, the larger the C-D gain). Several of these types of modifications will be depicted in detail below.

The process for modifying the gain using absolute control can be:
   if (tiltX used to control position along Y) scalefactorY= constant*tiltX
   else scalefactorY=constant*tiltZ
   end if If relative control is used to modify the gain, then the gain control process becomes:
   if (button transitions from not pressed to pressed) then
     save_tiltX=tiltX
     save_tiltZ=tiltZ
   end if
   if (tiltX used to control position along Y)
     scalefactorY=constant*(tiltX-save_tiltX)
   else
     scalefactorY=constant*(tiltZ-save_tiltZ)
   end if A nonlinear function such as velocity or acceleration can also be used to control gain with a process such as:
   scalefactorY=f1(tiltX,tiltZ)
   scalefactorZ=f2(tiltX,tiltZ)
   scalefactorX=f3(tiltX,tiltZ)
where f1, f2, f3 are some higher order functions dependent on one or both of tiltX, tiltZ.

All of the above tilt mappings and modifications can be applied equally well to the x and/or z axes instead of or in addition to the y-axis.

Rate control can also be used to control the pointing or cursor movement task. Rate control maps the relative change in position of the device from a starting point (i.e., when a button is pressed) to the velocity of the cursor in the direction of movement. As long as the button/clutch is engaged the cursor moves in the direction at the set speed. An example of rate control being used within the present invention is:
loop
   if (button transitions from not pressed to pressed) then
     save device coordinates
     (save_devX=devX, save_devY=devZ . . . )
   end if
   if (button pressed) then
     velocityX=(devX−save_devX)*scalefactorX
     velocityZ=(devZ−save_devZ)*scalefactorZ
     velocityY=(tiltX−save_tiltX)*scalefactorY
     (or tiltZ if desired)
     cursorX=cursorX+velocityX
     cursorY=cursorY+velocityY
     cursorZ=cursorZ+velocityZ
   else
     do nothing
   end if
   display cursor
end loop The tilt of the input device of the present invention can also be used to map to a rotation about an axis, to control the view of a scene being displayed to for example tumble or dolly the scene, to control flying through or navigation through a scene such as tilting forward to descend, tilting back to climb, tilt right to bank right and tilt left to bank left, etc.

Since input devices according to the present invention allow the user to move in a non-separable way in three-dimensional (3-D) space, the user can use the device to control a 3-D pointer in a 3-D scene in much the same way as a mouse is used to control a 2-D pointer in a 2-D scene. In addition, because the device can be constrained to movement along the x-z plane it can be switched into 2-D mode without any special or extra user actions and act like a traditional 2-D mouse.

The present invention has been described using a particular type of system (a tablet) capable of sensing both planar motion and tilt. Other systems for sensing tilt can be used. For example, a gyroscope can be used to sense tilt. The planar motion could be sensed by an input device on tracks similar to the type of mechanical motion device used to move the pen of a pen plotter and the tilt being sensed by a joy stick mounted on the tracks.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An input system, comprising:
   a hand held device movable in two dimensions in a first plane and continuously tiltable in at least a second plane perpendicular to the first plane and providing three dimensions of input simultaneously; and
   a sensing system coupled to the device and simultaneously converting two dimensional movement and continuous tilt of the three dimensions of input into a three-dimensional position while the continuous tilting is changing.

2. A system as recited in claim 1, wherein said device has a smoothly curved base.

3. A system as recited in claim 2, wherein the base has a flat spot.

4. A system as recited in claim 2, wherein the base is curved in two orthogonal directions.

5. An input system comprising
   a hand held device movable in two dimensions in a first plane and continuously tiltable in at least a second plane perpendicular to the first plane, having a curved base curved in two orthogonal directions by different amounts of curvature in the orthogonal directions; and
   a sensing system coupled to the device and converting two dimensional movement and continuous tilt into a three-dimensional position.

6. A system as recited in claim 1, wherein the position is a position of a cursor or pointer in a three dimensional display.

7. A system as recited in claim 6, wherein the position provides an input for absolute position cursor control, relative position cursor control or rate cursor control by said sensing system.

8. A system as recited in claim 1, wherein said device can be continuously tilted in the second and third planes with said sensing system converting tilt in the second plane into movement in a dimension and converting tilt in the third plane into a display control parameter.

9. A system as recited in claim 1, wherein motion in two dimensions is constrained to a surface.

10. A system for controlling three-dimensional movement of a cursor in a three-dimensional display, comprising:
    a tiltable mouse movable in two dimensions in a first plane and continuously tiltable in a second plane perpendicular to the first plane and comprising:
    a base asymmetrically curved along two axes and having a center of curvature and a circular flat spot at the center;
    a handle attached to said base and holdable by a hand of a user;
    a switched button mounted in said handle and accessible to a finger of the user;
    a position/tilt coil embedded in said base approximate to the center;
    a resistor connected to said switched button; and
    a control circuit connected between said coil and said resistor, and changing the coil responsive to a switched condition of said switched button;
    a sensing tablet detecting a two dimensional position and a continuous tilt of said coil and detecting a switched condition of said switched button;
    a display unit displaying the cursor in the three-dimensional display and having a display parameter; and
    a computer connected to said tablet and said display unit, converting the two dimensional position and tilt into a three-dimensional position and controlling a three-dimensional display position of the cursor in the three dimensional display responsive to the three-dimensional position and controlling the display parameter responsive to the switched condition.

11. An apparatus comprising a single input effector input device which can be moved in two dimensions in a first plane and continuously tilted in a second plane perpendicular to the first plane, and simultaneously producing a three-dimensional position from the movement in two dimensions and the continuous tilt.

12. A computer system having a program displaying a cursor and substantially simultaneously converting two dimensional position in a first plane and continuous tilt of a single input effector input device in a second plane perpendicular to the first plane into three dimensional position of the cursor.

13. An input process, comprising:
    sensing simultaneously two dimensional position in a first plane and continuous tilt of a single input effector hand held device in a second plane perpendicular to the first plane; and
    converting the two dimensional position and continuous tilt into a three dimensional position.

14. A process as recited in claim 13, wherein the three-dimensional position controls a three-dimensional position of an object of a three-dimensional scene.

15. A process as recited in claim 13, wherein the three-dimensional position controls motion of a three-dimensional view point in a three-dimensional scene.

16. A process as recited in claim 13, wherein the three-dimensional position controls three-dimensional zoom.

17. A process as recited in claim 13, wherein the three dimensional position controls scrolling.

18. A storage media storing an input process simultaneously detecting both two dimensional position in a first plane and continuous tilt of a single input effector hand held device in a second plane perpendicular to the first plane and converting the two dimensional position and continuous tilt into a three dimensional position.

19. An input system as recited in claim 1, wherein said device is continuously tiltable in a third plane perpendicular to the first and second planes and said sensing system converts the continuous tilt in the third plane into a control signal.

20. A system as recited in claim 10, wherein said mouse is tiltable in a third plane perpendicular to the first and second planes.

21. A process as recited in claim 13, wherein said sensing senses tilt in a third plane perpendicular to the first and second planes and said converting converts the continuous tilt in the third plane into a control signal.

22. An input system, comprising
- a hand held device movable in two dimensions in a first plane and continuously tiltable in at least a second plane perpendicular to the first plane and providing three dimensions of input simultaneously;
- a sensing system coupled to the device and simultaneously converting two dimensional movement and continuous tilt of the three dimensions of input into a three-dimensional position; and
- said hand held device comprises a single sensor providing the three dimensions of input simultaneously.

23. An apparatus comprising an input device which can be moved in two dimensions in a first plane and continuously tilted in a second plane perpendicular to the first plane and simultaneously producing a three-dimensional position from the movement in two dimensions and the continuous tilt; and
- said input device comprises a single sensor providing the three dimensions of input simultaneously.

24. A computer system having a program displaying a cursor and substantially simultaneously converting two dimensional position in a first plane and continuous tilt of an input device in a second plane perpendicular to the first plane into three dimensional position of the cursor; and
- said input device comprises a single sensor providing the three dimensions of input simultaneously.

25. An input process comprising:
- sensing simultaneously two dimensional position in a first plane and continuous tilt of a hand held device in a second plane perpendicular to the first plane; and
- converting the two dimensional position and continuous tilt into a three dimensional position;
- said hand held device comprises a single sensor providing the three dimensions of input simultaneously.

26. A storage media storing an input process simultaneously detecting both two dimensional position in a first plane and continuous tilt of a hand held device in a second plane perpendicular to the first plane and converting the two dimensional position and continuous tilt into a three dimensional position; and
- said hand held device comprises a single sensor providing the three dimensions of input simultaneously.

27. An input device which is movable on a flat surface comprising:
- a curved base which can be continuously tilted at a tilt angle falling between a range of angles; and
- a sensing device sensing a particular tilt angle and outputting the tilt angle, and sensing movement on the flat surface and outputting movement data corresponding to the movement.

28. An input device as recited in claim 27, wherein the base has a flat spot which the input device automatically rests on when not being tilted.

29. An input device as recited in claim 27, further comprising a position/tilt coil embedded in said base.

30. The input device as recited in claim 27, wherein said sensing device comprises a single sensor providing three dimensions of input simultaneously.

31. An input process comprising:
- moving a device on a flat surface;
- gradually tilting the device related to a vector perpendicular to the flat surface; and
- continuously determining the changing tilt of the device.

32. An input device which is movable on a flat surface comprising:
- a base;
- a handle attached to the base allowing the handle to be pointed at a tilt angle related to a vector perpendicular to the flat surface; and
- a sensing device sensing the tilt angle and outputting the tilt angle, and sensing movement of the base on the flat surface and outputting movement data corresponding to the movement.

33. An input device which is movable on a flat surface comprising:
- a base;
- a handle attached to the base allowing the handle to be pointed at a tilt angle; and
- a sensing device sensing the tilt angle and outputting the tilt angle, and sensing movement of the base on the flat surface and outputting movement data corresponding to the movement and said sensing device comprising a single sensor providing three dimensions of input simultaneously.

34. An apparatus as recited in claim 11, wherein the continuous tilt is spatially continuous.

35. A computer system as recited in claim 12, wherein the continuous tilt is spatially continuous.

36. A process as recited in claim 13, wherein the continuous tilt is spatially continuous.

37. A process as recited in claim 18, wherein the continuous tilt is spatially continuous.

38. A process as recited in claim 31, wherein the continuous tilt is spatially continuous.

39. A device as recited in claim 32, wherein the continuous tilt is spatially continuous.

* * * * *